United States Patent [19]

Russo et al.

[11] 3,916,160

[45] Oct. 28, 1975

[54] CODED LABEL FOR AUTOMATIC READING SYSTEMS

[75] Inventors: Frank A. Russo, Farmington; Ronald P. Knockeart, Walled Lake, both of Mich.

[73] Assignee: The Bendix Corporation, Southfield, Mich.

[22] Filed: Dec. 13, 1971

[21] Appl. No.: 207,206

[52] U.S. Cl. .................... 235/61.12 N; 235/61.11 E

[51] Int. Cl.$^2$ .......................................... G06K 19/06

[58] Field of Search ............... 235/61.11 E, 61.11 D, 61.12 N; 250/219 D, 219 DC, 555, 566; 340/146.3 K, 146.3 A, 146.3 Z

[56] References Cited

UNITED STATES PATENTS

| | | | |
|---|---|---|---|
| 3,543,007 | 11/1970 | Brinker et al. | 235/61.11 E |
| 3,623,028 | 11/1971 | Yoshida et al. | 235/61.11 E |
| 3,643,068 | 2/1972 | Mohan et al. | 235/61.12 N |
| 3,671,718 | 6/1972 | Fickenscher et al. | 235/61.12 N |
| 3,671,722 | 6/1972 | Christie | 235/61.12 N |
| 3,676,645 | 7/1972 | Fickenscher et al | 235/61.11 E |
| 3,701,886 | 10/1972 | Jones | 235/61.11 E |

*Primary Examiner*—D. W. Cook
*Attorney, Agent, or Firm*—Lester L. Hallacher

[57] ABSTRACT

A coded label for automatically identifying objects is described. The label is designed such that coding is achieved by the use of data segments with alternate segments having different energy reflective capability. The data segments are arranged in pairs and each defines a digital pulse space. Digital coding in the form of logic 1's and 0's is effected by assigning each data segment either of two widths. Hence, when the two segments defining a pulse space are dimensioned such that the segment having one reflective capability is wider than the segment having the other reflective capability, a logic 0 is indicated for the digital pulse base defined by that pair of segments. Reversing the reflective capabilities of the wide and narrow segments results in a reversal of the logic state of the digital pulse space defined by the pair of segments. However, in all instances, the digital pulse spaces defined by the segment pairs are equal and the segments are alternately arranged so that segment separation is realized. The label is also provided with label START and label END sections so that the beginning and ending of label scanning is precisely indicated.

5 Claims, 11 Drawing Figures

INVENTOR.
FRANK A. RUSSO
RONALD P. KNOCKEART
BY

INVENTOR.
FRANK A. RUSSO
RONALD P. KNOCKEART
BY

38
| | 8 | 4 | 2 | 1 |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
FIG 5
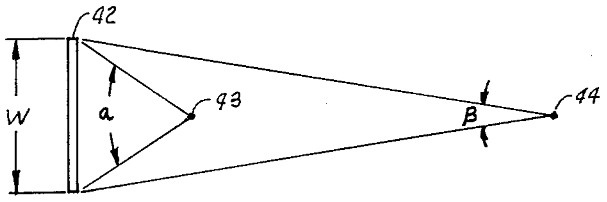
FIG 7
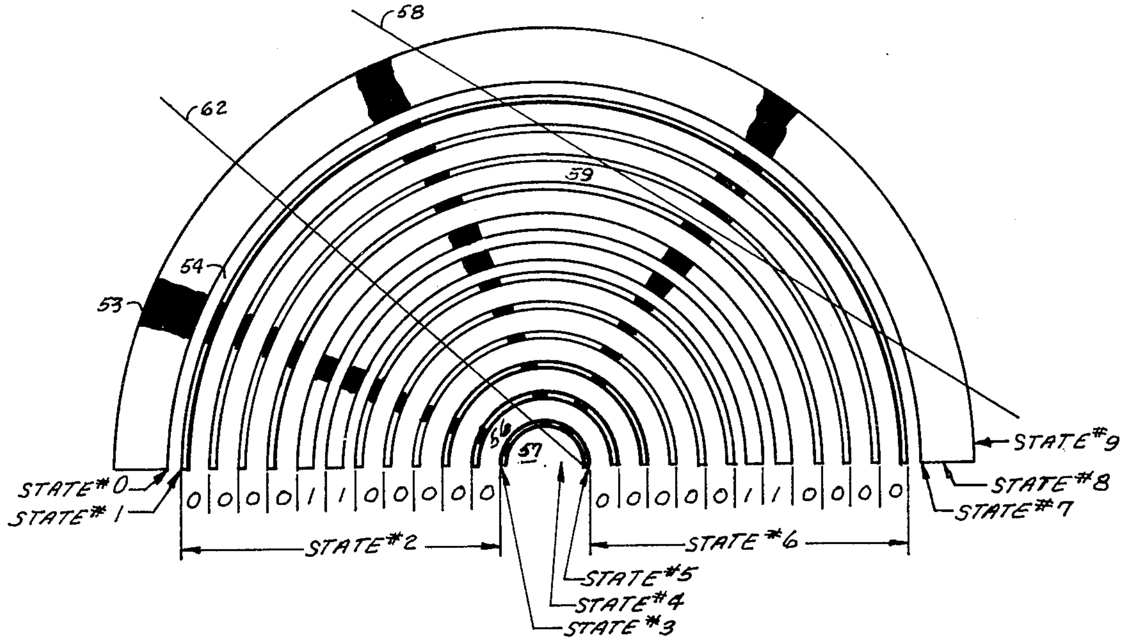
FIG 6
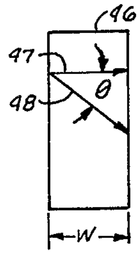
FIG 8
INVENTOR.
FRANK A. RUSSO
RONALD P. KNOCKEART
BY

INVENTOR.
FRANK A. RUSSO
RONALD P. KNOCKEART
BY

CODED LABEL FOR AUTOMATIC READING SYSTEMS

BACKGROUND OF THE INVENTION

Various types of automatic label reading equipment is presently available commercially and is well described in the patented art. Usually, automatic label reading equipment includes a label which has alternate areas of reflectivity, such as black and white, and the label is then scanned by the use of a light source so that the reflected light is modulated in accordance with the reflecting capability of the segmented label. The identification of the container upon which the label is placed is then determined by the coded information present in the label. This coded information is dependent upon the arrangement and the width of the black and white segments of the label.

Although some systems have met with limited commercial success, the presently available systems suffer certain deficiencies which have prevented them from having wide utilization throughout industry and for a wide variety of purposes. One limitation stems from the fact that, ordinarily, the coded information is dependent upon the widths of the segments of the label, that is, a narrow width could indicate a logic 0 and a wider width could indicate a logic 1. In this type of system, the information is encoded on the label simply by properly arranging the narrow and wide segments, and the differences in reflectivity of the segments is utilized only as a means of separating the segments.

This type of system is disadvantageous because the widths of the segments is the critical code determining characteristic. Because of this feature such a system is sensitive to both distance between the scanning mechanism and the label, and also the skew of the label, which causes the label to be angularly scanned. This is so because, as the scanning distance varies the apparent widths of the segments varies, and therefore it is possible for a narrow segment to appear as a wide segment at short distances and for a wide segment to appear as a narrow segment at a far distance. Skew apparently changes widths because, as the angle of scan through the label increases the distance across each segment scanned also increases, thereby possibly making a narrow segment appear to be a wide segment.

In another type of automatic label reading system, the reflectivity of each segment is used directly to indicate the logic state, that is, a dark segment could indicate a logic 0 and a light segment could indicate a logic 1. This type of system is disadvantageous because it is very difficult to distinguish dirt spots and faded spots and other types of noise from the encoded information, and therefore inaccuracies frequently occur in the system. Furthermore, if the code requires adjacent segments of the same reflectivity it is very difficult to separate segments.

Both of the types of systems described hereinabove also suffer the deficiency of making it very difficult to determine when the scanning of the label has been initiated and when it has been terminated. The accuracy of the system is therefore adversely affected because, in many instances, the scanning which occurs prior to reading the label appears as dark and light spots because of the inherent reflective characteristics of the object upon which the label is placed. Furthermore, it is frequently difficult to tell when scanning of the label has been terminated for this same reason. As a consequence, the erroneous identification of objects containing the labels is very possible and frequently occurs.

CROSS-REFERENCE TO RELATED APPLICATIONS

U.S. Pat. application Ser. No. 207,150 now U.S. Pat. No. 3,735,096, filed by Frank A. Russo and Ronald P. Knockeart of even date herewith and also assigned to The Bendix Corporation, describes logic circuitry useful with the labels described herein.

U.S. Pat. application Ser. No. 207,036 now U.S. Pat. No. 3,813,140, filed by Ronald P. Knockeart of even date herewith and assigned to The Bendix Corporation, describes an optical system useful in scanning the inventive labels described herein.

U.S. Pat. application Ser. No. 207,214 now U.S. Pat. No. 3,860,794, filed by Ronald P. Knockeart and John R. Wilkinson of even date herewith and assigned to The Bendix Corporation, describes analog circuitry useful in the control circuitry associated with the inventive label described herein.

SUMMARY OF THE INVENTION

The invention overcomes the deficiencies of the prior art system in that it is relatively insensitive to changes in distance between the scanned label and the scanning mechanism, and also because it is relatively insensitive to skew of the label with respect to the line of scan. Furthermore, the inventive label includes a means for specifically identifying the beginning of the label and the end of the label, thereby enabling an accurate determination that the entire label has been scanned and thus differentiating the scanned background from the scanned label information. As used herein the term "label" means any configuration of data encoded in accordance with the invention, and should not be construed as being limited to physically attachable labels.

The inventive label defines a plurality of active states which are used to indicate that a label has been located, to accurately encode the information on the label, and to indicate that a label has been scanned and label scanning has terminated. The first active state is represented by a wide segment which is wider than any of the encoding segments of the label. The wide segment has the same reflective capability for all labels and is used to indicate that the scanning of the label has been initiated and therefore represents a label locating segment.

The next active state is a narrow segment having a reflective capability different from that of the wider label locating segment. This segment is used to terminate the wide label locating segment and is also used as an initiation segment to indicate that the immediately following information will be digital information representative of the encoding upon the label. The initiation segment preferably is narrower than the label locating segment.

The next active state is the encoded informational state which is representative of the identification of the article upon which the label is placed. If the code is binary coded decimal (BCD), four consecutive bits are needed for each numerical informational character. Thus, a two-character number requires eight bits; three characters require twelve bits; etc. Thus, in the inventive system, each informational bit requires one digital pulse space, and each digital pulse space is defined by two data segments having different reflective capabilities. The two data segments which define a digital pulse space are different in width. However, all digital pulse spaces are equal in width. Accordingly, each digital pulse space is defined by a pair of data segments, with each of the segments having a different reflective capability and width. The logic level of each digital pulse space is determined by the reflective capability of the widest of the two segments which compose the pair.

The next state is defined by a narrow segment which is the same width as the initiation segment but which is different in reflective capability. This segment combines with the last segment on the label to indicate that a complete series of coded segments, and hence a complete label, has been scanned.

The last state is defined by a wide segment having the same width but a different reflective capability from the label locating segment. This segment thus defines an end of label segment.

Because of this unique series of states, the scanning of the label in a direction perpendicular to the segments results in a precise indication that a valid label has been located and completely scanned. Furthermore, because of the precise definition of the beginning and end of the label and the states which separate the encoded segments form the start and termination segments, the encoded segments are separated from the other segments and the label is distinguishable from the environment.

The manner of encoding the information in the coded informational state is also unique and advantageous over the techniques utilized in the prior art systems. In the inventive label each logic 0 or 1 is defined by a pair of data segments, each of which has a different reflective capability and a different width. That is, consecutive coded segments are combined into pairs which define the digital pulse spaces. Each digital pulse space contains a wide and a narrow segment having different reflective capabilities. The logic state of the digital pulse spaces is determined by the reflective capability of the widest coded segment within the pair of segments defining the digital pulse space. For example, if within a digital pulse space there is a narrow high reflective segment and a wide low reflective segment, the logic state would be determined by the reflectance of the wide segment and the digital pulse space would be assigned a logic 1. Reversal of the reflective capabilities of the coded segments would result in a reversal of the logic state for the digital pulse space. Obviously, if desired, a wide high reflective segment can be used to indicate a logic 0 state.

In the inventive label the reflective capabilities of all alternate segments are different so that each segment is easily distinguished from those immediately adjacent it. Accordingly, every digital pulse space includes a first segment having a particular reflective capability and a second segment having the other reflective capability. For example, each digital pulse space could have first a dark and then a light segment; in this case the wide label locating segment would be dark, the narrow initiation segment light, the narrow termination segment bars, and the wide end-of-label segment light.

The inventive label configuration is also unique in that all narrow coded segments are of the same dimension and all wide coded segments are of the same dimension. As a consequence, each pair of coded segments defines a digital pulse space which is equal in dimension to all other digital pulse spaces. Because of this feature the inventive label is relatively insensitive to variations in the distance between the scanning mechanism and the label being scanned and also to the skew angle of scan across the face of the label. This feature results because the logic state of each digital pulse space is determined by the reflectivity of the widest segment relative to the narrow segment rather than by the absolute widths of the segments. As a consequence, the apparent width changes of the coded data segments occasioned by skew or distance variations have very little effect upon a system employing the inventive label.

Although the inventive label can also be used with other types of codes it is primarily intended for usage with a binary decimal code. In this type of code any one of nine different digits (10, if zero is included, and 16 if all possible combinations are used) can be uniquely identified by utilizing four bits, each of which is defined by a digital pulse space. The inventive label therefore can be arranged to yield two specific information characters by the use of eight digital pulse spaces. Obviously, if a third character identification is required, an additional four digital pulse spaces can be added to the label. However, additional character information can be added to the container upon which the label was mounted simply by adding additional labels. This is advantageous because all labels can be of the same length and width irrespective of the number of characters required to identify the container. Therefore, assuming that each label contains eight digital pulse spaces and accordingly uniquely identifies two characters, an additional two characters can be added to the information on the box simply by adding another label. As will become more apparent hereinafter in the detailed description, the amount of information which can be added to the container can be increased by two characters simply by adding labels ad infinitum within the spatial limits of the container on which the labels are placed.

The unique manner of deriving the digital information by the utilization of segment pairs to define digital pulse spaces also permits a label configuration which is totally insensitive to skew or orientation variations. This is accomplished by the use of a label which is circular and which therefore has radial symmetry about its center point. As a consequence, the label can be accurately read irrespective of its orientation on the container which it identifies and irrespective of the orientation of the container with respect to the scanning system. An additional advantage arises from the circular label because the container can be rolling as it passes the scanning mechanism. The only orientation requirement on reading the circular label is that the label must be visible to the scanning mechanism. The plane of the label need not be normal to the line of sight of the scanning mechanism.

BRIEF DESCRIPTION OF THE DRAWINGS

FIG. 5 shows a binary coded deimal useful in understanding the inventive system.

FIG. 6 shows a bisected circular label and is useful in explaining the features of the label.

FIG. 7 illustrates the apparent change in width of the scanned segments as the distance between the segments and the source varies.

FIG. 8 illustrates the increase in scanning width of the segments as a function of the skew angle of scanning.

DETAILED DESCRIPTION

Figure 1:
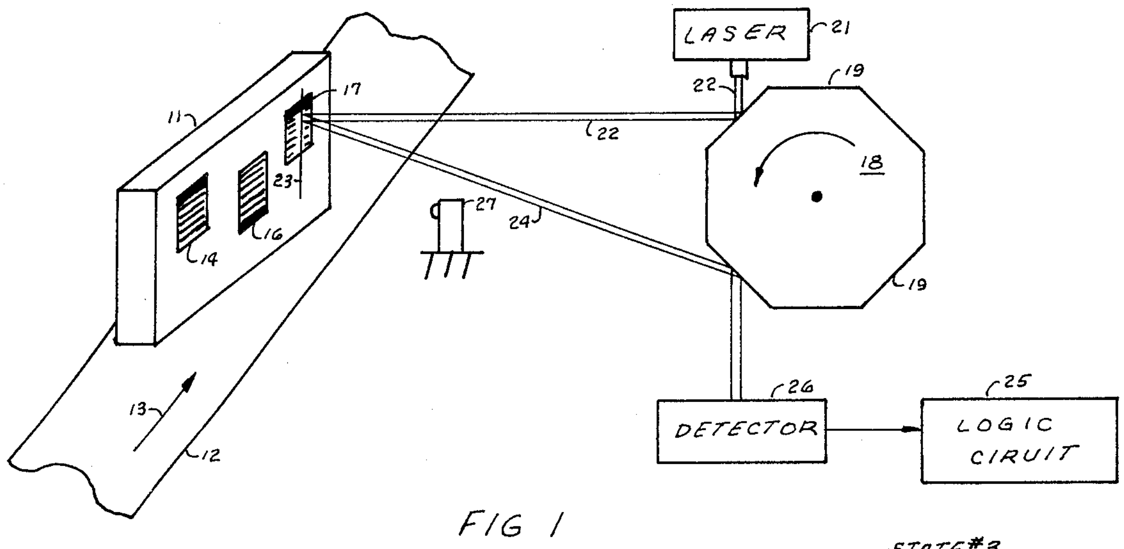
FIG. 1 shows a container identified with a plurality of labels and a system for scanning the labels.

FIG. 1 is a simplified showing of a system for scanning a Container 11 moving along a Conveyor 12 with the container being identified with a plurality of the inventive Labels 14, 16, and 17. In the system Container 11 is placed upon Conveyor 13 which is moving in the direction indicated by the Arrow 13. The motion of Container 11 past the scanning mechanism is continuous and can be as high as 400 feet per minute or more, depending upon the scanning rate of the system. Mounted upon Container 11 is a set of Labels 14, 16, and 17. Identification of the contents of Container 11 is coded onto the Labels 14, 16, 17 in a manner fully described hereinafter. Accordingly, in order to identify the container and/or its contents it is necessary to scan the labels sequentially so that the information encoded onto the labels can be detected and subsequently decoded.

Scanning is effected by use of a rotating Prism 18 configured with a plurality of Reflective Surfaces 19. In the illustrated embodiment Prism 18 is octagon in configuration, and therefore has eight Reflective Surfaces 19. However, it should be understood that any number of reflective surfaces can be used depending upon the desired scanning rate, scanning angle, and other operational characteristics of the system. Prism 18 is rotated about its center axis at a very high rate of speed by some convenience mechanism such as a constant speed motor, which is not shown.

An Energy Source 21 is placed in the proximity of Prism 18 so that the Energy Output 22 is reflected by the Reflective Surfaces 19 to Container 11. Energy Source 21 is designed to emit a very narrow beam of the energy and, if light is used, can be a laser or other type of high intensity light source. After being reflected from prism Faces 19 the energy impinges upon Container 11 and, as the angular orientation of Prism 18 changes because of the rotation, the entire surface of Container 11 is scanned in a vertical direction, as indicated by Scanning Line 23 across the surface of the container. Obviously, this scanning technique results in the scan of Labels 14, 16, and 17 in sequential order. It will be appreciated that, in the system shown, scanning occurs with the container upright so that the scanning is vertical; however, if desired, scanning can occur horizontally with the scanning mechanism positioned above Conveyor 12 and obviously, by rotating Prism 18 and the labels 90°, scanning can occur horizontally. The primary consideration is that the direction of scanning is perpendicular to the direction of motion of Container 11.

As the energy reflects from the container and the label, it is reflected back to the Reflective Surfaces 19 of Prism 18 as indicated by the Reflected Energy Lines 24. Because of the varying reflective characteristics of the container and the segments of the labels, the reflected energy is modulated and hence the coded information printed upon Labels 14, 16, and 17 is reflected to an appropriate Detector 26 and decoded in Decoder 25. Decoder 25 is fully described in U.S. Pat. No. 3,735,096, fully referenced hereinabove. If the illuminating output energy from Source 21 is light, Detector 26 will contain a photocell and, if necessary for amplification purposes, a photomultiplying tube or some other type of energy detecting apparatus.

A Light Source 27 is positioned in the proximity of Conveyor 12. This light source is used to actuate the logic circuitry associated with the system when a container is within the field of view of the scanning mechanism. Accordingly, the output light from Source 27 is directed across the conveyor where it can be intercepted by a photodetector to indicate that the beam is unbroken. When a container breaks the beam of light, the presence of a container has been detected and the logic circuit actuated. Alternatively, if desired, a reflector can be placed upon the other side of Conveyor 12 so that the output of Source 27 is reflected from the reflector to a photodetector in the proximity of Source 27 indicating that no container is in a position to be scanned. However, when a container does move into a scanning position, the energy reflected from the container is much less than that reflected from the reflector, and the presence of a container is indicated.

As shown in FIG. 1, Container 11 includes three Labels, 14, 16, and 17, which are horizontally spaced and which are alternately arranged so that adjacent labels are 180° out of phase. As will become more apparent hereinafter, the number of labels used is dependent upon the amount of information which is required for identification purposes and also the number of characters which can be identified by a single label. In FIG. 1, Labels 14, 16, and 17 are shown horizontally aligned and uniformly spaced; neither of these is required. The labels can be randomly positioned on the container so that they are neither aligned nor uniformly spaced. Preferably, the labels will be horizontally spaced so that a label is completely scanned before scanning of the succeeding label is initiated. This simplifies data processing in Circuit 25 but is not a firm requirement because data from two labels can be separated in Logic Circuit 25 by noting the scanning of the wide segments of the labels.

The alternate 180° positioning of successive labels assists in separating the data from adjacent labels and permits close horizontal spacing of adjacent labels as is now fully described hereinafter.

Figures 2, 9:
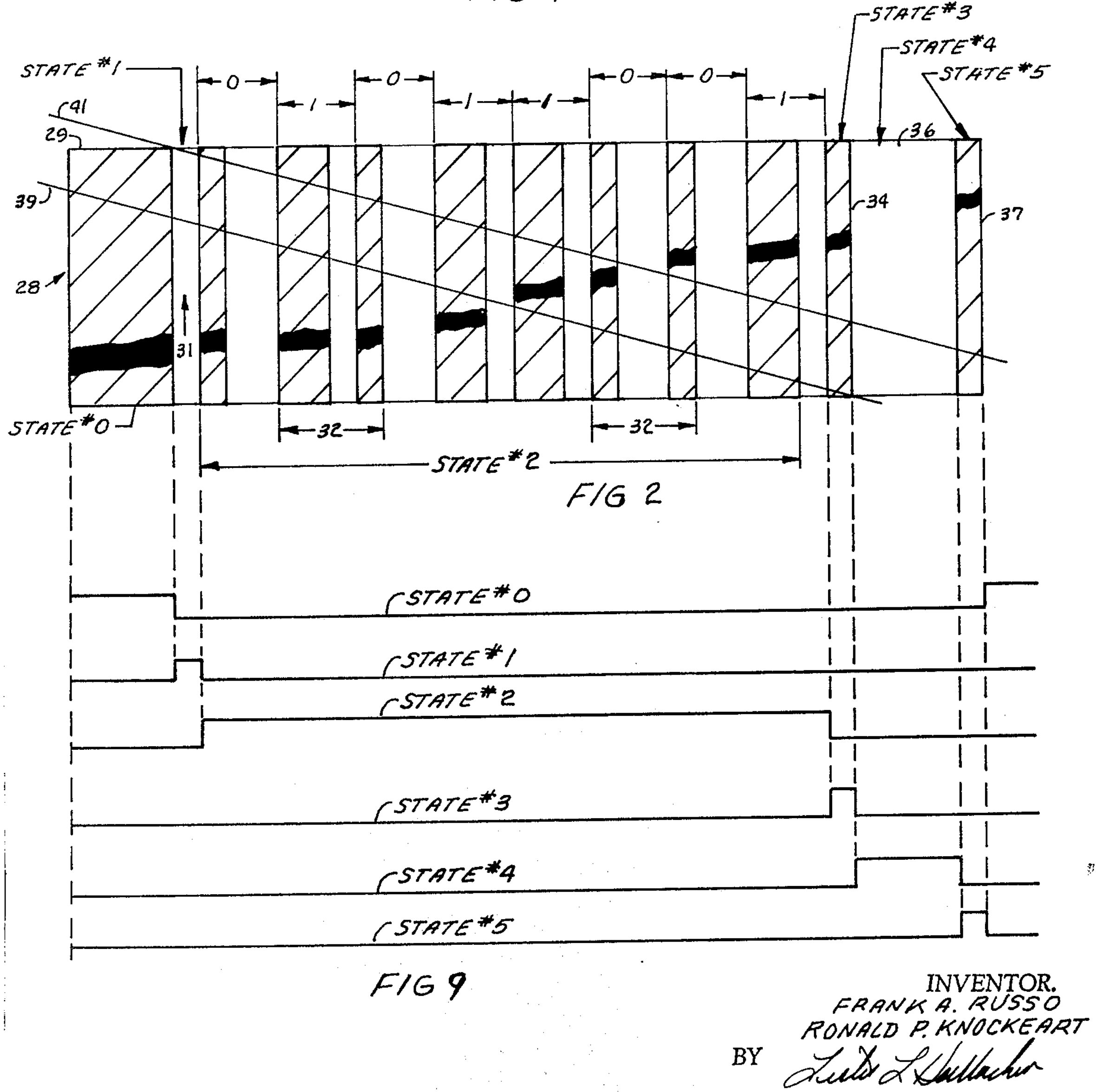
FIG. 2 is a preferred embodiment of a rectangular configuration of the inventive label.
FIG. 9 shows the sequence of operational states defined by the various segments of the rectangular label.

FIG. 2 shows a preferred embodiment of a rectangular label in accordance with the inventive concepts. Rectangular Label 28 is composed of a series of segments which have different reflectivity capabilities. For convenience of illustration and discussion, the segments are illustrated and frequently referred to as black segments and white segments. However, it will be appreciated that various color combinations can be used for the segments and, alternatively, different shades of the same color can be used. However, it will be understood that the segments must have substantially different reflectivities and this limits the allowable combinations. It will also be appreciated that, although the label is described as having varying light reflective characteristics, the reflective capability can be directed to acoustic or other forms of energy as well. Obviously, if another type of energy is selected the energy Source 21 and other components of the optical system illustrated in FIG. 1 will be selected to operate with the selected energy. It will also be appreciated that, although the energy absorbing capability could be referred to with equal validity. The label is illustrated with crosshatching and solid white segments. It should be appreciated that this is done merely as a convenience and that the small solid black portions are intended to illustrate that the segments containing them are solid black.

Lable 28 illustrated in FIG. 2 defines a plurality of states which are useful for various purposes more fully described hereinafter. Before describing the various operational functions defined by the various segments it is helpful to first appreciate the basic arrangement of the label. The segments on the label alternate in reflective capability so that adjacent segments can be viewed as forming pairs, with each pair performing a distinct operational function. In FIG. 2 the first pair is composed of Segments 29 and 31. Segment 29 is much wider than Segment 31 or any other segment except Segment 36. Segment 29 is the first segment on the label scanned. Segment 31 separates Segment 29 from the succeeding segments and also provides a means of determining that Segment 29 is within a selected range of widths and thus is distinguished from dirt spots and other types of system noise. Segments 29 and 31 thus form a label locating functional pair.

Immediately following Segment 31 is a series of dark and light segments which are grouped into pairs so that every pair contains one dark and light segment. These pairs represent digital pulse spaces which define logic 1's and 0's as determined by whether the widest segment of the pair is dark or light. These segments therefore define coded pairs and all such pairs constitute a coded information function.

The last narrow Segment 34 is paired with wide light Segment 36 to form a label termination function. Segment 34 therefore serves to separate Segment 36 and the last coded pair segment and also to maintain an even number of segments on the label. Because there is an even number of segments the label begins and ends on wide segments of different reflective capability; i.e., Segment 29 is dark and Segment 36 is light.

Segment 37 merely separates the label from the background upon which the label is scanned and accordingly does not fall within a pair and has no particular width.

Although the segments are grouped into pairs to define operational functions of the pairs, some of the individual segments form active states which are individually processed in the logic circuitry. These states are defined as States No. 1 and No. 5 and are illustrated in FIG. 2. Wide dark Segment 29 is used to define State No. 1. As illustrated in FIG. 2 Segment 29 indicates a State No. 0. State No. 0 is the normal condition of the system during the scanning of a container and prior to the change to State No. 1 at the transition from Segment 29 to Segment 31. When Segment 29 is scanned and determined to fall within a selected range of widths the transition from Segment 29 to Segment 31 initiates State No. 1, indicating that a label has been located. The width of Segment 29 is confined to a selected range of widths as a means of separating the label from printing and other dark areas which may appear on Container 11. State No. 1 is therefore used to indicate that a label has been located.

The detection of Segment 31 immediately arfter a dark area falling within the preselected range width verifies that the dark area is a label segment and not just a spot on Container 11 which accidentally falls in the width range. Segment 31 also separates Segment 29 from the first data segment and therefore is used as an indication that coded information will immediately follow the end of State No. 1. Segment 31 also validates the label because it is checked for a particular width. Accordingly, three checks are defined by Segments 29 and 31, so that Segment 31 has a width between two numbers, $N_1$ and $N_2$, and Segment 29 has a width $N_3$, greater than the narrowest permissible width for Segment 29, where $N_3 > N_2 > N_1$.

State No. 2 is the coded information of the label which is defined by the pairs of dark and light segments lying between narrow Segments 31 and 34. In viewing FIG. 2 it will be noted that each Coded Pair 32 includes one narrow segment and one wide segment and that both reflective capabilities are represented by the segments of a pair. The logic conditions defined by the coded pairs is indicated by the 0's and 1's which appear above the Coded Pairs 32 in FIG. 2. The 0's and 1's are the data bits which represent the coded characters in accordance with FIG. 5, explained hereinafter. Therefore, it will now be appreciated that each data bit is defined by a Digital Pulse Space 32 and each of the Digital Pulse Spaces 32 includes first a dark segment and then a light segment. This permits an alternate arrangement of segments across the entire face of the label so that the segments are easily separated and identified by the decoding system which receives the reflected energy.

Irrespective of their reflective capabilities, all narrow segments are the same width and all wide segments are the same width, so that the total width of each Coded Pair 32 is the same. As an example, if desired, the narrow segments can be one-half the width of the wide segments so that each Digital Pulse Space 32 is equal to three times the width of the narrow segments. The logic state of each Digital Pulse Space 32 is determined by the reflective capability of the wide segment. As an example, in the label of FIG. 2 the first pair of coded segments includes a narrow black and a wide white segment. Accordingly, the white segment dominates and the pair represents a logic 0 for that bit weight. The next digital pulse pair includes a wide black segment and a narrow white segment. The wide black segment therefore dominates the reflective capability of the pair and this pair therefore represents a logic 1 for its bit weight. Continuing this analysis for all Digital Pulse Spaces of State 2 of the label shown in FIG. 2, the code 01011001 is read. The eight bits of coded information are used to identify the container upon which the label is placed.

Immediately following the white segment of the last digital pulse space is the narrow black Segment 34. Segment 34 defines State 3, which is used to separate Wide Segment 36 and the last coded segment and thus also represents the end of the coded information and indicates that the next scanned information should be wide white Segment 36. Segment 36 defines State 4, which indicates the scanning of a complete label has been effected and thus indicates that a valid label scan has been completed.

The Black Area 37 which immediately follows Wide Segment 36 is used to separate the label from the container background. The transition from Segment 36 to Segment 37 is used to generate State 5 for use by the detection system.

The sequence of the active states can be understood by referring to FIG. 9, which shows a set of waveforms identified as States 0 through 5. In all of these waveforms the high level indicates that the state is active and the low level that the state is inactive. State 0 is active when Photocell 27 of FIG. 1 indicates that a container is being scanned. This state exists until Wide Dark Segment 29 is scanned and determined to be within the established width limits.

State 0 ends and State 1 begins at the transition from Segment 29 to Segment 31. State 1 remains active for the scanning duration of Segment 31. The transition from Segment 31 to the first dark coded segment ends State 1 and starts State 2. State 2 remains active until the last light coded segment to Dark Segment 34 terminates State 2 and starts State 3. Segment 34 therefore separates the Wide Light Segment 36 from the coded information and also terminates reception of the coded information.

State 4 begins and State 3 ends with the transition from Segment 34 to Segment 36 and is active for the scanning period of Segment 36. The transition from Segment 36 to Area 37 ends State 4 and starts State 5. At the beginning of State 5 a valid label has been scanned and observation of the proper preselected widths of Segments 29, 31, 34, and 36 has verified the label.

State 5 ends at the end of Area 37, showing the label is terminated and a return to State 0 is effected.

The selection of the widths for the various segments is dependent upon the operational functions the segments are paired to perform. Thus, the coded segments are dimensioned to form a series of equal width Coded Pairs 32. Segments 29 and 36 are wider than all other segments to distinguish them from the other segments and also to assist in distinguishing the label from the container and the background. If desired, Segments 29 and 36 can be equal in width. Segments 31 and 34 perform the function of separating Wide Segments 29 and 36 from the coded segments and thus are narrow in order to keep the label as small as possible. Segments 31 and 36 can be equal in width and can be the same width as the narrow coded segments.

Because eight digital bits are encoded onto Label 28 of FIG. 2, $2^8$ or 128 possible combinations of 0's and 1's are available. The output code therefore can be used in a strict binary sense to indicate 128 different identifications of the contents of the container upon which the label is mounted. Alternatively, if desired, binary coded decimal (BCD) can be used. Although BCD is well known to those skilled in the art, a brief explanation of BCD is useful in understanding the invention.

Accordingly, FIG. 5 shows a binary coded table which is used to identify 0 through 9 decimal characters of information. Character identification is represented by the various combinations of 0's and 1's present in the four columns, labeled 9, 4, 2, and 1. By considering the first Digital Pulse Space 32 scanned on Label 28 of FIG. 2 as the most significant bit for the first character encoded onto the label and by also considering the left column pulse position shown in FIG. 5 as the most significant pulse position, the character represented by the first four Digital Pulse Spaces 32 can be identified in accordance with the table shown in FIG. 5. The fifth digital pulse space on Label 28 is the first, or most significant, bit for the second character encoded onto Label 28. Hence, the eight logic states shown above Label 28 in FIG. 2 uniquely identify two characters. The first sequence of four bits above label 28 is 0101. This sequence is seen in FIG. 5 to identify the character "5." The second sequence of pulses is 1001, which according to FIG. 5 indicates the character "9." Thus, Label 28 carries the number "59."

The arrangement and width selection of the segments of Label 28 result in several distinctive advantages over existing machine read labels. Firstly, because the first Segment 29 of the label is much wider than all other segments of the label, a very precise and exact determination that a label has been located is given. This is accomplished because Segment 29 represents a particular pulse width which must fall within a maximum and minimum range. The permissible range of widths results in several distinct advantages. First, it establishes a distinction between Segment 29 and most printing or extraneous spots and marks on the container and label which otherwise could be confused as a label segment. However, because of the known width of Segment 29 only spots which are substantially equal in size to Segment 29 can possibly appear as a valid scan across the segment. This significantly increases the system insensitivity to ambient "noise." Furthermore, because a wide segment appears first, the detection system remains inactive until such a segment is scanned. This prevents erroneous readings which otherwise would result when the label is scanned at a large skew angle along a scan line which does not completely scan Segment 29. This is more fully described hereinafter. Another advantage stems from the fact that Segment 29 must be followed by a narrow light Segment 31. For this reason even if an extraneous dark spot on the label at first appears as a scan of Segment 29 an erroneous reading is not given because it is unlikely that an extraneous mark simulating narrow Segment 31 will immediately follow the extraneous dark spot. Accordingly, a scan across a spot appearing as a Segment 29 will result in a "no-read" indication. Narrow Segment 31 also provides an indication that coded information is to immediately succeed the end of the Segment 31. This provides a warning of the start of coded information to the system.

After all the segments which include the coded information are scanned, the Narrow Dark Segment 34 provides an indication that the end of coded information has been reached. Initially, it appears that this segment can be confused with one of the narrow dark segments of the coded information. This is avoided because narrow Segment 34 is immediately followed by the wide White Segment 36. Segments 34 and 36 form a pair of segments which is distinguished from a Digital Pulse Pair 32 by the difference in width of the two different types of pairs. Dark Segment 34 therefore also serves to separate the coded informational pairs from the End-of-The-Label Segment 36 which indicates that the end of the label has been reached.

The highly reflective wide Segment 36 is thus used to definitely indicate that a complete scan of a label has been made. Furthermore, Segment 36 also prohibits erroneous readings in the presence of substantial skew. This is so because too great a skew angle can result in a scan line which passes through the preceding four states of the label without passing completely through Segment 36. This is illustrated by Line 39 of FIG. 2. Line 39 passes through Label Locating Segments 29 and 31 and all the coded Pulse Pairs 32 but does not pass through all of Segment 36. When this condition occurs the label has not been properly scanned and a no-read output indication is given.

The initiating Segment 29 is also useful in avoiding the erroneous reading of labels which are skewed at too great an angle with respect to the scanning mechanism. This is illustrated by Line 41 of FIG. 2 which passes through Segment 31, the coded segments, and Segment 36 of the label but does not pass completely through Segment 29. Because a complete scan of Segment 29 is required for the subsequently scanned segments to be counted in the processing system, this condition results in a "no-read" indication. In viewing FIG. 2 it will be noted that the permissible skew angle is a function of the width of the label. This can be understood by noting Scan Line 39 and 41 which, respectively, pass through only a portion of the segments defining State 4 and State 1. In both instances an increase in the width of Label 28 would cause both Scan Lines 39 and 41 to pass completely through all segments of the label, thus resulting in accurate output readings. The width of the labels therefore will be selected in accordance with the maximum desired skew angle and also, obviously, with respect to the dimensions of the container upon which the label will be placed.

FIG. 7 is useful in understanding how the widths of the scanned segments apparently change as the distance between the segments and the scanning radiation changes. In FIG. 7 a segment is represented by the dark Rectangle 42, having a fixed width W. If scanning occurs from a Point 43 the radiation forms an angle $\alpha$ with respect to the extremeties of Segment 42. It will be noted that in both instances the entire segment is scanned but the angles $\alpha$ and $\beta$ differ substantially. For this reason, systems which are dependent upon a measurement of a width of the reflective segments are very sensitive to variations in distance. This is so because an increase in distance can cause wide segments to appear as narrow segments while a decrease in distance can make a narrow segment appear to be a wide segment. This effect does not occur when using the inventive label configuration because the output bit weights are determined not by the absolute widths of the segments but instead by a comparison of the reflective capabilities of the two segments which define each of the Digital Pulse Spaces 32. The advantage of this technique is further enhanced by dimensioning Label Initiation Segment 29 and Label Termination Segment 36 to be greatly in excess of the coded segments.

FIG. 8 is useful in understanding how the novel features of the inventive label help to reduce the system sensitivity to skew angle. In FIG. 8 a Segment 46 having a width W is shown being scanned across a Vector 47 which is perpendicular to the sides of the segment and a Vector 48 which is skewed with respect to the sides of the segment by an angle $\theta$. Trigometric relationships readily show that the vector 48 is longer than the Vector 47 by a function of the cosine of the angle $\theta$. As a consequence, a system which utilizes an absolute segment width measurement as the encoding information is sensitive to skew angle because of this apparent change of the segment widths as the skew angle $\theta$ increases. However, in the inventive label this effect is virtually eliminated because of the operational characteristics realized by utilizing two coded segments to define pulse code spaces. Another cause of skew can be understood by referring to FIG. 1; the orientation of Container 11 can be such that the plane of the label is not normal to the propagating path of the scanning energy. This can occur if Container 11 is not parallel to the line of motion indicated by Arrow 13 and also if Container 17 is not vertical with respect to Conveyor 12. The inventive label can be accurately read irrespective of the existence of either or both of these conditions because decoding is not dependent upon the absolute widths of the coded segments.

As explained hereinabove, when using binary coded decimal (BCD) four bits are required for each character of identification. Accordingly, in order to expand the label of FIG. 2 to a three-character identification label while employing BCD, it is necessary to add an additional four digital pulse spaces, that is, eight reflective segments. This is perfectly feasible and is advantageous in many instances. However, depending upon the number of characters which must be coded onto the labels, an undesirably long label may result. It is therefore possible to add two characters of information to a container simply by adding another label to the container. In this manner any number of characters can be identified on the container simply by adding one label for each of the two characters.

It should be noted that the positioning of the various labels on the container is not particularly important so long as they are horizontally spaced. Horizontal spacing is preferable because a complete label will then be scanned before any portion of the succeeding label is scanned. This eases the data processing within the logic circuitry but otherwise is not essential to the intended operation.

Referring to the label of FIG. 2 it is noted that the first segment scanned, that is, Label Initiation Segment 29 is dark while Label Termination Segment 36 is light. This arrangement of segments prevents the erroneous reading of a label if the container is placed on the conveyor upside down. This is so because the logic circuitry will not accept any data which is not preceded by Wide Dark Segment 29 immediately followed by Narrow Segment 31. However, because of this feature when additional labels are added some means must be established for distinguishing the two labels and insuring that the labels are sequentially processed; that is, insuring that the first label is processed first and the second label is processed second, etc. This is effected by placing the second label on the container so that it is upside down or rotated 180° with respect to the first label. Accordingly, Wide White Segment 36 appears at the top and Wide Dark Segment 29 appears at the bottom of the second label.

It will be noted that if two labels are thus applied to the container it will be impossible to identify the upside down orientation of the container on the conveyor. This is prevented from occurring by adding a third label to the container. This third label is positioned so that the Segment 29 is positioned at the top of the label. The addition of the third label therefore renders it impossible to erroneously read a container which is placed on the conveyor upside down. Furthermore, it has the additional advantage of very specifically indicating that a label has fallen off of the container which could result in an erroneous reading. This occurs because the processing circuitry is set up to receive information from a preselected number of labels, and therefore if less than this number of labels is read, a no-read indication is given. Details of this operation are presented in the logic circuitry application more definitely identified hereinabove.

Figure 10:
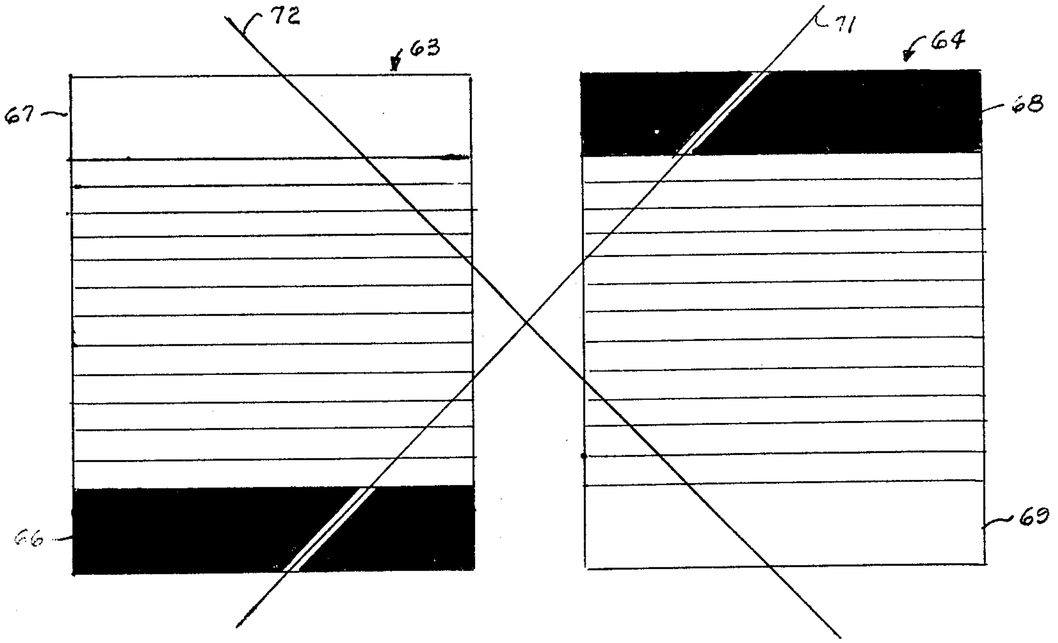
FIG. 10 shows how the alternate orientation of adjacent labels permits close spacing of the labels.

Because of the alternate arrangement of labels, when the second label is scanned the wide white Segment 36 becomes the first segment scanned and the wide black Segment 29 becomes the last segment scanned. This makes it a simple task to very precisely separate the data received from sequential labels so that the data from the several labels cannot be intermingled and misread in the processing circuitry. However, it should be noted that alternate label orientation is not essential because label separation can be effected simply by spacing the labels a minimum predetermined distance apart and timing the scanning pulses received between labels. This is a less precise technique for separating the data received from successive labels but in certain instances could be preferable. The alternate orientation of adjacent labels and the use of the label initiate and label terminate segments are also useful in placing a number of labels in a minimum of space. This is illustrated with respect to FIG. 10, which shows two adjacent, closely spaced Labels 63 and 64. The labels are alternately orientated so that Dark Segment 68 of Label 64 is at the top while Dark Segment 66 of Label 63 is at the bottom. Because the labels are closely spaced, a single scan line can pass through part of both labels, as illustrated by line 71. Because Scan Line 71 passes through Dark Segment 68 the label initiate state is entered into. However, because a wide light segment is not scanned last the label termination state is not entered into and an invalid reading cannot be generated.

If scanning occurs along Line 72 the label initiate state is never entered into and an invalid signal is again prevented by the alternate arrangement of Labels 63 and 64. It will be appreciated that if Label 63 is rotated 180° so that Segments 66 and 67 are reversed a scan along either Line 71 or 72 can appear as a valid scan, resulting in an erroneous reading. This is avoided, in most instances, by the State counts because it is very unlikely that the skewed scan lines will result in precisely the required State sequencing.

In summary, the rectangular label configuration described with respect to FIG. 2 can be defined as having five active states. The first state is defined by the wide dark Segment 29 and is the label initiation state. Second is State 2, which is defined by the narrow white Segment 31 and is defined as the encoding initiation state. The alternate dark and light segments which define the Digital Pulse Spaces 32 are encoded during this state. State No. 4 is defined by the narrow black Segment 34 which defines the end of coding information. The fourth state is defined by wide white Segment 36 which defines the end of the label. The fifth state is generated after the transition from the light Segment 36 to the Segment 37.

The five states are defined with respect to a single rectangular label. Accordingly, in one possible mode of operation employing two labels, the wide white segment of the second label can be used to define a sixth state which represents the beginning of the second label. This state will then be followed by State No. 7 which is defined by the narrow black Bar 34 in which the coded information is received. State No. 8 will be defined by the narrow white Segment 31 which will indicate the end of the coded information and the ninth State will be the transition from the wide black Segment 29 which defines the end of the second label. The addition of a third label would then add an additional five states which would be identical to those for the first label.

Another mode of operation utilizing a plurality of labels consists of reversing the role of the label initiate and label terminate segments of alternating labels. In this usage Wide White Segments 36 become the label initiate segments and Wide Dark Segments 29 becomes the label termination segments for those labels which have the Wide White Segments 36 at the top.

It may in some instances be desirable to confine all labels to simply two characters of coded information and therefore any additional characters would require the addition of one or more labels. However, if only four characters are required for accurate identification of the container, only two labels would be required. This would then open the possibility of improperly reading boxes which appear upside down on the conveyor because a wide dark segment would always be scanned first. A third label could be added to prevent such an upside down inaccurate reading condition. Because no additional information is needed the third label would simply be used to identify the presence of the proper number of labels and the proper orientation of the container. However, it should be noted that, if desired, the additional label can be placed first so it is properly read and is used to indicate the number of labels which are to follow. This would then properly actuate the logic circuitry so that the proper number of labels is read and the data from these labels is properly processed and separated.

The rectangular label described hereinabove is very advantageous for many usages, and particularly when additional character information may be required to be added to a container simply by adding another appropriately coded label to the container. However, it does suffer the disadvantage of being sensitive to skew angles above a maximum value and of being incapable of being read upside down when an even number of labels is used.

Figure 4:
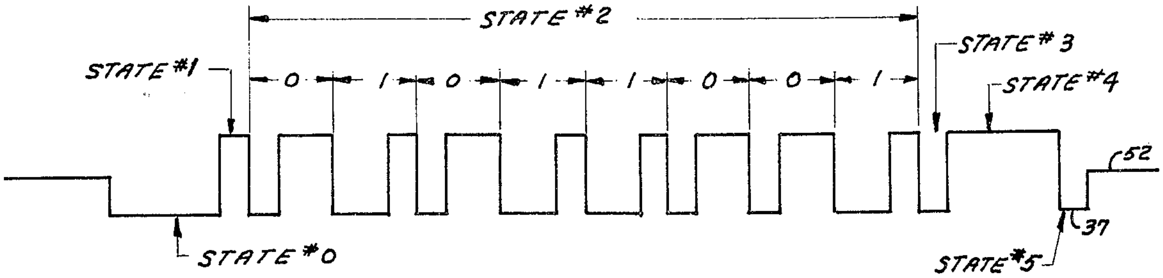
FIG. 4 shows the pulse code which will be obtained from the energy reflected from the label of FIG. 2.

FIG. 4 shows a pulse train which will be received during one complete scan of the Container 11. It will be appreciated that a large number of scans is completed while Label 28 is within the field of view of the scanning system. Accordingly, a large number of the waveforms shown in FIG. 4 will be input to the logic circuitry. In FIG. 4 while the container is being scanned some signal is received as represented by 51. The level of this received energy will be random depending upon the reflective capabilities of the container. However, it will not in any instance have any effect upon the processing circuitry. As soon as the Dark Segment 29 of Label 28 shown in FIG. 2 is scanned the reflected energy will assume a low value of reflection. This value defines State 1, but the transition to State 1 or any other state will not occur until the transition to the next color occurs. In the pulse train of FIG. 4, State 1 is shown coincident with the transition between label initiation Segment 29 and Segment 31 of FIG. 2. The energy reflected from Segment 31 has a higher amplitude because of the higher reflective capability because of Segment 31, and this represents the initiation of State 2 as indicated in both FIGS. 2 and 4. The alternate levels of the reflected energy received during the scanning of the coded information defined by State 2 are also illustrated in FIG. 4. Accordingly, by establishing the logic circuit to indicate a logic 0 when the widest energy level for a digital pulse space is high and a logic 1 when the widest reflected level for a digital pulse is low, the 01011001 code shown in FIG. 4 is established by the label. This code is consistent with the code appearing above Label 28 of FIG. 2. At the end of the last coded sesgment, State 4 is received which is a low reflected energy level representative of the reflected energy from Segment 34. The higher state of Segment 36 is then received and is indicative of State 5. The termination of this state is then represented by the wide black Segment 37 so that the label is ended, at which time the received reflected energy is the environmental energy represented by Level 52.

As mentioned hereinabove, by rotating Prism 18 at a very high number of revolutions per minute, a large plurality of complete scans of the label is received and therefore a large number of the pulse waveform shown in FIG. 4 is input to the logic circuitry. The utilization and processing of these waveforms is fully described in U.S. Pat. No. 3,735,096 fully referenced hereinabove.

The rectangular label described hereinabove has many advantageous usages. However, the inability to read the label upside down or to read the label while the container is rolling along the conveyor in some instances may be disadvantageous. Furthermore, the limited skew angle at which the label can be read also may be disadvantageous in some instances. Accordingly, the circular label illustrated in FIG. 3 and described hereinafter has many significant advantages in that it can be read in any orientation and also while the container upon which it is mounted is rolling. The circular label illustrated in FIG. 3 is also advantageous because it is insensitive to skew for all possible orientations.

Figure 3:
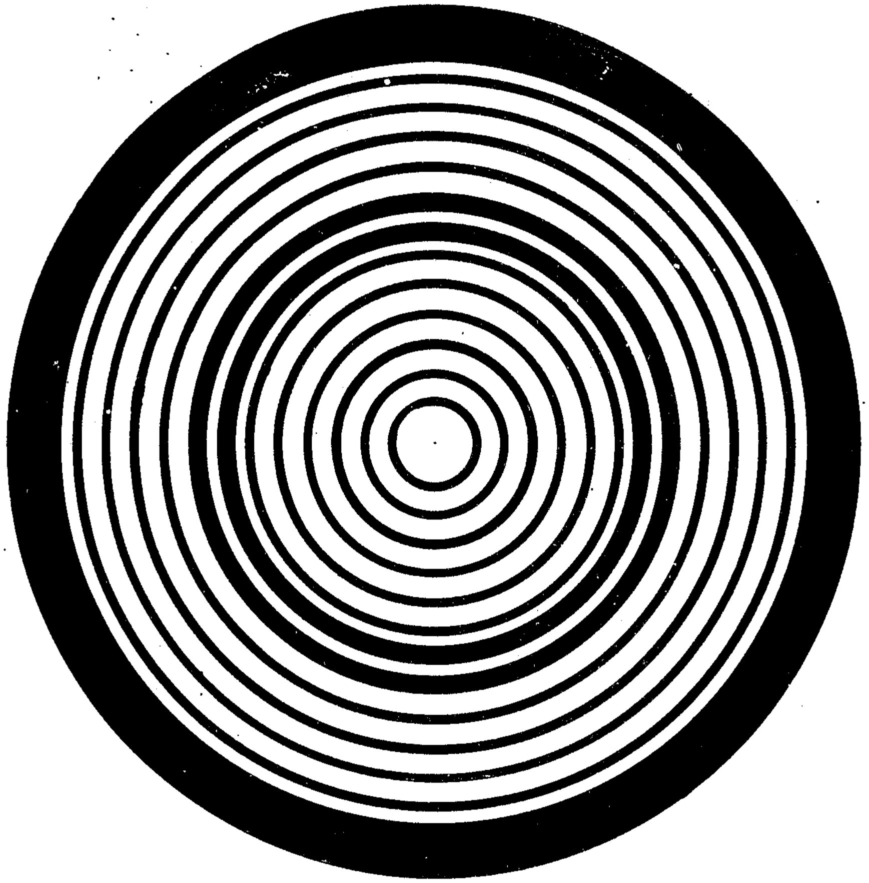
FIG. 3 is a preferred embodiment of a circular configuration of the inventive label.

It will be noted that the configuration shown in FIG. 3 is a circular configuration and the encoded information has radial symmetry about the center of the circle. Accordingly, the label can be appropriately read for all possible orientations, the only requirement being that the line of the scan passes through the bullseye or center of the label.

The circular label shown in FIG. 3 is advantageous because it is totally insensitive to all skew angles and can be read for all orientations of the container upon which it is placed. Furthermore, the embodiment shown in FIG. 3, as is the embodiment shown in FIG. 2, is insensitive to the angular disposition of the plane of the label with respect to the line of sight of the scanning mechanism. That is, the container can be set on Conveyor 12 at a very substantial angle with respect to the line connecting Prism 19 and the perpendicular to the Conveyor 12. This insensitivity to planar angular orientation is also a feature of the constant digital pulse spacing of the label which is also instrumental in rendering the system insensitive to distance variations and skew angle of scan.

The circular label configuration shown in FIG. 3 is very similar to the rectangular configuration shown in FIG. 2 in that it contains the label locating Segment 53 which is analogous to label locating Segment 29 of FIG. 2. The initiating Segment 54 of the circular label is analogous to the similarly defined Segment 31 of FIG. 2. Immediately following Segment 54 is a series of dark and light segments which are grouped into pairs to define the digital pulse spaces which contain the coded information. The narrow dark Segment 56 which lies immediately adjacent the highly reflective Center 57 is analogous to the coded information termination Segment 34 of FIG. 2 and indicates that the end of the coded information has arrived. Center 57 of the circular configuration is analogous to the label termination Segment 36 of the FIG. 2 configuration.

For convenience in identifying the various segments and coded information of the circularly configured label a bisected label is illustrated in FIG. 6. It should be noted that this label is identical to the full label shown in FIG. 3, and its bisection is done merely to ease the explanation and the illustration of the various states defined by the label. The use of solid black for all dark segments is avoided by convenience of illustration and in order to permit a full showing of Lines 62 and 68.

As shown in FIG. 6, Segment 53 defines State 1 which is the label locating segment utilized in indicating that a valid label has been located. A change from State 0 to State 1 occurs at the transition from Segment 53 to Segment 54. State 1 is followed by State 2, which indicates that the width of Segment 53 is within the acceptable limits and Segment 54 is below a maximum value, and that therefore the subsequent data will be coded logic information. State 2 accordingly is the state during which coded information is received. It should be noted that State 2 for the circular label is different from the State 2 of the rectangular label shown in FIG. 2, because the rectangular label utilizes only eight digital pulse spaces. The rectangular label of FIG. 2 is used to establish binary coded decimal while State 2 of the FIG. 6 circular configuration is used as strictly binary codeing. Accordingly, because eleven pulses are available, there are $2^{11}$ possible combinations and hence there are 2,048 possible combinations of information which can be encoded onto the label. Obviously, if desired, logic bits can be added or subtracted from the label in accordance with the required capacity of the label. It should also be noted that, if desired, the circular configuration can also be used with binary coded decimal. Hence, if twelve logic bits are used, three precise characters can be identified. It will also be appreciated that, if desired, the rectangular label configuration illustrated in FIG. 2 can be used with straight binary coding rather than with BCD.

Referring again to FIG. 6, Dark Segment 56 which immediately follows the last of the digital pulse spaces defines State 3 which is indicative of the end of the coded information and which also indicates that a wide label termination segment should follow. Center 57 of the circular configuration is analogous to the State 4 situation in that it indicates that one half of a valid circular label has been scanned. It should be noted that up to this point the four states defined by the circular configuration of FIG. 6 are identical to the four states defined by the rectangular configuration of FIG. 2.

Immediately succeeding Center 57, Segment 56 is again scanned, which now represents State 5 which indicates that a complete Center 57 has been scanned and therefore coded information will follow. However, because of the radial symmetry of the segment about the center of the label the information now received will be in reverse order from that received in State 2. The reverse order reception of the information therefore is defined as State 6. At the end of State 6 Segment 54 is again scanned, which defines the seventh state and indicates the end of the reverse coding information and indicates that a wide label ending Segment 53 should follow. Segment 53 therefore defines the end of the label as defined as State 8. It should be noted that the label repeats itself, and therefore Segment 53 defines the start and the end of the label while Segment 54 is used to indicate that coded information will begin and end. The transition from the Segment 53 to the light background generates State 9.

Because the circular configuration has 100 percent radial symmetry, a valid reading can be obtained irrespective of the scan angle across the label. Furthermore, because of the definition of the nine states, erroneous readings which could be occasioned by extraneous spots or partial scans of the label cannot be received because it is necessary to scan across the Center 57 of the label. This can be understood by considering Line 58, which represents a scan across the label but which does not pass through the Center 57 of the label. With such a scan Segment 53 is completely scanned and is properly followed by Segment 54, and therefore the logic circuitry would be in readiness to receive coded information. Accordingly, as the scan line proceeds across the coded segments it will appear as if a proper label is being scanned. However, when Segment 59 is reached it will appear as if a wide reflective segment is being scanned, and thus Segment 59 will appear as an end-of-label segment. This situation would then be analogous to the scanning of Center 57 of the circular configuration or label terminating Segment 36 of the rectangular configuration. Because the proper number of digital pulse spaces has not been scanned previous to Segment 59 and also because Segment 59 is followed by more coded information instead of by Segment 56 which terminates Center 57, the information is not validated by the logic circuitry. Furthermore, as is now fully explained in U.S. Pat. No. 3,735,096 successive scans are compared and only valid scans through Center 57 result in a proper comparison. This feature also prohibits the acceptance of partial scans such as Scan 58 of FIG. 6.

Line 62 of FIG. 6 also represents a scan line which does not result in an acceptable reading. Assuming that scanning occurs along the Line 62 so that a very small Cord 61 of Center 57 of the label is scanned, a valid reading is not obtained because Cord 61 has a length which is substantially shorter than that required for a termination segment. Scanning Cord 61 therefore does not result in an appearance as a label ending segment and an acceptable scan would not be indicated. The accuracy of the label therefore is increased by establishing the logic circuitry such that valid scans are indicated for State 4, Center 57 of the label, only when a cord equal to a predetermined high percentage of the diameter of the label is scanned. In this manner only a well defined range of widths for State 4 results in acceptable readings.

The insensitivity of the circular label to skew is occasioned by the radial symmetry because any scan line across the label which passes through the center can result in a proper reading irrespective of the angular orientation of the scan line with respect to vertical or horizontal. However, skew insensitivity is also achieved because any scan line which does in fact pass through or in the proximity of the center of the label must pass through the coded segments in a direction which is substantially perpendicular to the tangents to the coded segments at that point. Therefore, there is no apparent change in width of the data segments occasioned by any skew angle irrespective of the magnitude of the angle.

Skew insensitivity results from the radial symmetry of the label. Accordingly, any configuration having substantial radial symmetry can be employed. Any polygonal configuration, such as octagons or hexagons can therefore be employed. However, symmetry, and thus absolute identical scanning information for all scan lines, decreases as the number of sides decreases. Accordingly, a square label can be used in some instances but will be somewhat disadvantageous over an octagonal or circular label.

Figure 11:
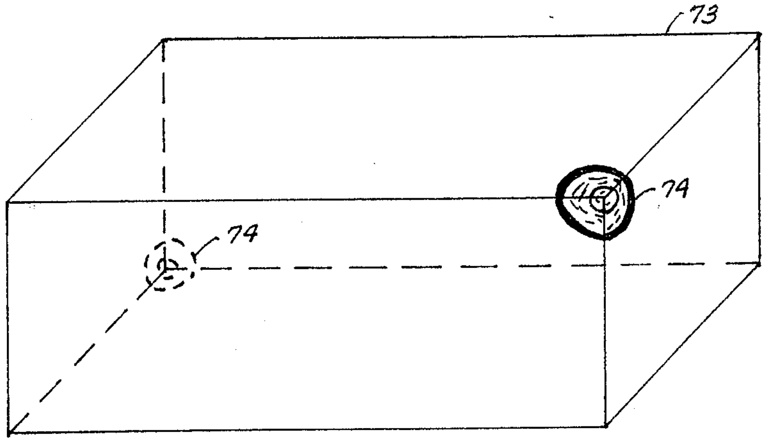
FIG. 11 shows how two circular labels can be used so that a container can be identified for all possible orientations.

FIG. 11 shows how two circular labels can be placed upon a single container such that the container can be accurately identified irrespective of the orientation of the container with respect to the scanning mechanism. In FIG. 11, a Container 73 is illustrated having circular Labels 74 on each of two corners. Labels 74 are placed on diagonally disposed corners of the container. Furthermore, Labels 74 are positioned so that a portion of each label is fixed to three sides of the Container 73 and the center of the labels coincides with the intersection of the sides of the container. As a consequence, all sides of Container 73 carry a portion of a label. Because of the radial symmetry of Labels 74, complete and accurate scans of at least one label can be effected for all possible orientations of Container 73. This is true because, as explained hereinabove, the plane of the label scanned need not be perpendicular to the line of sight of the scanning mechanism.

It will be noted that each of the sides of the Container 73 carries a 90° pie section of the label. As a consequence, at least one quarter of a label will be scanned irrespective of the orientation of Container 73 with respect to the scanning mechanism. Reference to FIG. 6 shows that, by defining State 4 by one half of the center of the label, a scan of one half the label will result in a valid scan and accurate decoding of the label. Accordingly, the placment of two labels on a single container in the manner illustrated in FIG. 11 results in the capability of accurately identifying the container irrespective of its orientation with respect to the scanning mechanism.

It will be noted that for most orientations of Container 73 two sides of the container will be visible to the scanning mechanism. This facilitates, rather than degradates, the capability of reading the container because valid scans will be received from label portions on two sides of the container rather than from a single side.

What is claimed is:

1. A coded label for use in a system for automatically reading said label by scanning with energy and thereby identifying an object carrying said label, said label comprising:

a plurality of energy reflective segments; a first portion of said segments having a first energy reflective capability and a second portion of said segments having a second energy reflective capability, said segments being arranged so that adjacent segments have different energy reflective capabilities;

said segments being grouped into at least three groups to define the operational functions of a label locating function, a coded information function and a label termination function;

said coded information function including a plurality of pairs of said segments, each of said pairs including a segment of each of said reflective capabilities, one segment of each pair having a first width and the other segment of each pair having a second width greater than said first width so that the total width of all pairs are equal, each of said pairs defining a logic ONE or ZERO in accordance with the reflective capabilities of said second width;

said label locating function including one pair of said segments, one of said segments having one of said reflective capabilities and the other of said segments having the other of said reflective capabilities, one of said segments having a width equal to said first width and the other of said segments having a width greater than said second width;

said label termination function including one pair of said segments, one of said segments having one of said reflective capabilities and the other of said segments having the other of said reflective capabilities, one of said segments having a width equal to said first width and the other of said segments having a width greater than said second width;

wherein the widest segment of the segment pair defining said label termination function and the widest segment of the segment pair defining said label locating function are substantially equal in width; and wherein said widest segments have different reflective capabilities, and the narrow segments of said locating and termination function pairs have different energy reflective capabilities.

2. The label of claim 1 wherein said label is rectangular and said segments are parallel to two sides of said rectangle.

3. The label of claim 2 in combination with additional identical labels except for the coding of said coded information function so that said object carrier 2n—1 labels, where n is any integer, and adjacent labels are rotated 180° with respect to one another; and said labels are spaced so that scanning of a label is completed before scanning of a succeeding label is started.

4. The label of claim 1 wherein said label is circular and said segments are concentric about the center of said circle.

5. The label of claim 4 wherein the center of said label serves as said widest segment of said segment pair defining said label termination function.

* * * * *